(12) United States Patent
Gegner et al.

(10) Patent No.: US 8,793,878 B2
(45) Date of Patent: Aug. 5, 2014

(54) METHOD FOR MANUFACTURING A ROLLING ELEMENT BEARING

(71) Applicant: Aktiebolaget SKF, Gothenburg (SE)

(72) Inventors: Juergen Gegner, Forchheim (DE);
Wolfgang Nierlich, Schweinfurt (DE);
Armin Olschewski, Schweinfurt (DE);
Kenred Stadler, Schweinfurt (DE);
Arno Stubenrauch, Aidhausen (DE);
Markus Volkmuth, Werneck-Zeuzleben (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/677,860

(22) Filed: Nov. 15, 2012

(65) Prior Publication Data

US 2013/0251298 A1    Sep. 26, 2013

(30) Foreign Application Priority Data

Mar. 20, 2012 (DE) .......................... 10 2012 204 409

(51) Int. Cl.
*B21K 1/04* (2006.01)
*F16C 33/64* (2006.01)
*C21D 9/40* (2006.01)

(52) U.S. Cl.
USPC ............... 29/898.066; 29/898; 29/898.13; 29/898.14; 148/589; 148/906; 384/589; 384/492; 384/625; 384/912

(58) Field of Classification Search
CPC .......... F16C 33/64; F16C 33/21; F16C 33/58; F16C 33/583; F16C 33/62; F16C 33/14; B21K 1/04; B21H 1/12; C21D 9/04; C21D 6/02; C21D 6/04; C21D 7/00; C21D 7/02; C21D 7/04; C21D 7/06; C21D 7/08; C21D 7/13; C21D 8/00; C21D 8/005; C21D 8/0205; C21D 8/0278; C23C 22/50; C23C 22/62
USPC ............... 29/898.066, 898.063, 898, 898.12, 29/898.13, 898.14; 384/569, 912, 492, 384/625; 148/589, 650, 651, 906

See application file for complete search history.

(56) References Cited

U.S. PATENT DOCUMENTS 2,202,773 A    5/1940   Given
3,737,204 A *  6/1973   Burkhardt ..................... 384/569

(Continued)

FOREIGN PATENT DOCUMENTS

DE    2419819         12/1974
DE    102007061193    6/2009

(Continued)

*Primary Examiner* — Sarang Afzali
(74) *Attorney, Agent, or Firm* — Bryan Peckjian; SKF USA Inc. Patent Department

(57) ABSTRACT

A method for manufacturing a rolling-element bearing includes forming an inner ring from a steel having a sulfur content of 0.002 to 0.015 mass % and an oxygen content of less than 15 ppm, subjecting the inner ring to a hardening heat treatment that ends by performing a final heat treatment step at a predetermined temperature, cold working the inner-ring raceway to generate compressive residual stresses at least in a surface layer of the inner-ring raceway, subjecting the inner ring to a bluing treatment and subjecting the blued inner ring to a thermal post-treatment process at a temperature below the predetermined temperature of the final hardening heat treatment step. The resulting rolling-element bearing may exhibit compressive residual stresses having an absolute value of at least 200 MPa at 0.1 mm beneath the outer surface of the inner-ring raceway and a maximum value of 1500 MPa or less throughout the inner ring.

16 Claims, 2 Drawing Sheets

(56) References Cited

U.S. PATENT DOCUMENTS

| | | |
|---|---|---|
| 3,920,488 A | 11/1975 | Pitton |
| 5,104,463 A | 4/1992 | Menke |
| 6,309,476 B1 | 10/2001 | Ravenscroft et al. |
| 6,531,000 B1 * | 3/2003 | Takemura et al. ............ 148/286 |
| 7,004,637 B1 | 2/2006 | Uyama et al. |
| 7,144,545 B2 | 12/2006 | Gegner |
| 7,163,650 B2 | 1/2007 | Gegner |
| 2013/0089283 A1 | 4/2013 | Trojahn et al. |
| 2013/0251298 A1 | 9/2013 | Gegner et al. |

FOREIGN PATENT DOCUMENTS

| | | |
|---|---|---|
| DE | 102009023818 A1 | 12/2010 |
| DE | 102011077214 A1 | 12/2011 |
| DE | 102010031439 A1 | 1/2012 |
| DE | 102011006296 A1 | 10/2012 |
| EP | 0105540 | 4/1984 |
| EP | 1310469 A2 | 5/2003 |
| EP | 1331211 A2 | 7/2003 |
| EP | 1541377 A1 | 6/2005 |
| JP | H03-184839 | 8/1991 |

* cited by examiner

METHOD FOR MANUFACTURING A ROLLING ELEMENT BEARING

CROSS-REFERENCE

This application claims priority to German patent application no. 10 2012 204 409.4 filed on Mar. 20, 2012, the contents of which are fully incorporated herein by reference.

TECHNICAL FIELD

The present invention generally relates to a rolling-element bearing and to a method for manufacturing such a rolling-element bearing, e.g., for use in a wind turbine.

BACKGROUND

Especially for rolling-element bearings that have very large dimensions, such as e.g., rolling-element bearings used in wind turbines, a long trouble-free operation and thus a long lifespan or service life of the rolling-element bearing is required in view of the high costs of the rolling-element bearing itself and the high costs caused by a shutdown of large-scale systems equipped with such bearings.

However, in systems that utilize very large rolling-element bearings, extreme peak load conditions sometimes occur, particularly under the effect of vibrations, which cannot be handled by simply scaling up the design of standard bearings. Rather, it has been necessary to furnish the bearing with exceptional material properties that are tailored to the expected load profile.

SUMMARY

It is an object of the present teachings to disclose improved rolling-element bearings that have a very long lifespan (service life) even when operated in extreme load situations, as well as methods of manufacturing and using the same.

In one aspect of the present teachings, a method for manufacturing a rolling-element bearing is disclosed. The rolling-element bearing preferably includes an inner ring with an inner-ring raceway, an outer ring with an outer-ring raceway and a plurality of rolling elements, which roll on the inner-ring raceway and on the outer-ring raceway.

The inner ring is preferably manufactured from a steel having a sulfur content of 0.002 to 0.015 mass % and an oxygen content less than 15 ppm, and is subjected to a heat treatment to harden it. The heat treatment is concluded with the execution of a final heat treatment step at a predetermined temperature. Compressive residual stresses are formed or generated in an outer (edge zone) layer of the inner ring by cold working (strain hardening) in the area of the inner ring raceway. After the cold working, the inner ring is subjected to bluing (passivation). The blued inner ring is then subjected to a thermal post-treatment at a temperature below the temperature of the final heat treatment step.

The individual steps of the method according to the present teachings are preferably executed in the above-mentioned order. However, not all steps need be executed in a close spatial or temporal connection. Rather, it is possible to produce intermediate products, which will be processed at a later time and/or at a different location.

By utilizing the manufacturing methods according to the present teachings, the susceptibility of the processed steel to surface crack formation is reduced. Under extreme loading conditions in the mixed friction regime, crack-inducing sliding friction between the rolling-element surface and the inner-ring raceway of the rolling element bearing in the highly-stressed micro-contact regions is reduced. Further, the penetration of hydrogen into the inner-ring raceway is hindered. This has a positive effect on the lifespan of the rolling-element bearing.

Accordingly, methods according to the present teachings provide the advantage that rolling-element bearings having very long service lives can also be achieved, even if they are, for example, briefly exposed to extreme peak load operating conditions. Thus the present teachings are particularly suitable for the manufacture of rolling-element bearings for wind turbines, especially for wind turbine gearboxes.

The formation of the desired microstructures in the inner ring can be achieved with the heat treatments disclosed according to the present teachings. As a result of the hardening, the inner-ring raceway is reliably protected from mechanical damage, from material fatigue and from an unacceptably high amount of wear.

The inner ring can be manufactured with a sulfur content of 0.006 to 0.015 mass %. Furthermore the inner ring can be manufactured with an oxygen content less than 10 ppm, e.g., less than 5 ppm. The inner ring can be manufactured, e.g., from a through-hardening rolling-element bearing steel.

Between the cold working step and the bluing step, a mechanical surface finishing treatment can be performed on the inner ring. This treatment enables damaged surface regions of the inner ring to be ablated, the final near-surface compressive residual stress state to be optimized and/or the surface roughness to be reduced. The surface finishing can take place, e.g., through grinding and/or honing.

Prior to the cold working step (e.g., in the heat hardening step), the inner ring can be subjected to martensitic hardening, case hardening and/or induction hardening. In such embodiments of the present teachings, the temperature of the last heat treatment step can be the tempering temperature of the inner ring.

In the alternative, prior to the cold working step (e.g., in the heat hardening step), the inner ring can be subjected to bainitic hardening (transformation). In such embodiments of the present teachings, the temperature of the last heat treatment step can be the bainitic transformation temperature.

A retained austenite content of 8 to 18 volume % can be formed in the inner ring. More preferably, a retained austenite content of 10 to 16 volume % can be formed in the inner ring. A retained austenite content within these ranges can be advantageous when the bearing is subjected to the above-described extreme conditions of rolling contact loading, because it appears to assist in impeding crack formation and growth.

Compressive residual stresses can be formed in the inner ring up to a minimum depth below the surface of the inner-ring raceway with an absolute value in the amount of a minimum value or above, wherein the minimum depth is preferably 0.1 mm and the minimum value of the absolute value of the compressive residual stress is preferably 200 MPa. The minimum depth can be, e.g., 0.2 mm or more. The minimum value of the absolute value of the compressive residual stress can be, e.g., 400 MPa or even 500 MPa. Preferably, continuous compressive residual stresses with an absolute value of the minimum value or above are formed up to the minimum depth in the inner ring in the same region of the surface of the inner-ring raceway. At depths greater than the minimum depth, the inner ring can exhibit compressive residual stresses with an absolute value below the minimum value. For example, the absolute value of the compressive residual stresses at depths greater than the minimum depth can decrease with increasing depth. The compressive residual stresses reduce the tendency of the inner ring to crack when subjected to localized friction-induced tensile loads and thus leads to an increased service life of the rolling-element bearing.

Compressive residual stresses can be formed in the inner ring beneath the (outer) surface of the inner-ring raceway with an absolute value in the amount of a maximum value or below, wherein the maximum value of the absolute value of the compressive residual stresses can be 1500 MPa. More preferably, the maximum value of the absolute value of the compressive residual stresses can be, e.g., 1000 MPa or even only 800 MPa. Compressive residual stresses can be formed in the inner ring beneath the (outer) surface of the inner-ring raceway over the entire depth with an absolute value amounting to the highest value or less.

The inner ring is preferably subjected to the thermal post-treatment at a temperature that is at least 10 K below the temperature of the final heat treatment step. The thermal post-treatment can be performed at a temperature of at least 100° C. The post-treatment is particularly effective if it is performed at a temperature that is no more than 100 K below, e.g. no more than 50 K below, the temperature of the last hardening heat treatment step. The decrease of the X-ray diffraction line width can be used as a measure of the effectiveness of the thermal post-treatment. For example, for the full width at half maximum of the {211}-ferrite (martensitic/bainitic) X-ray diffraction line, excited by chromium Kα X-ray radiation, a decrease of at least 0.05° at at least one location within the mechanically influenced zone (surface and/or depth) can serve as a criterion for an effective thermal post-treatment.

The thermal post-treatment preferably occurs as closely as possible just below the tempering temperature for a not too long period of time, e.g., at most 5 hours. The thermal post-treatment time depends on the component thickness and the thickness of the mechanically influenced surface layer, in order to optimize, without significant loss of hardness, the stabilization of the structure, which is mechanically influenced by the surface treatment and the cold working after the hardening heat treatment. Experience has shown that a maximum of two hours is sufficient for the thermal post-treatment, even for a large wall thickness. If bainitic hardening is performed instead of martensitic, case, and/or induction hardening, the statements concerning the tempering temperature apply in a corresponding manner for the bainitic transformation temperature.

The outer ring and/or the rolling elements can be subjected to a hardening heat treatment with a final heat treatment step. The same heat treatment method can also be used as was used for the inner ring. In the alternative, a different method can be substituted for the heat treatment of the inner ring. Furthermore, the outer ring and/or the rolling elements can be subjected to cold working, a bluing treatment performed after a surface finishing (if necessary), and/or a thermal post-treatment at a temperature below the temperature of the final heat treatment step.

The present teachings further relate to a rolling-element bearing that includes an inner ring having an inner-ring raceway, an outer ring having an outer-ring raceway and a plurality of rolling elements, which roll on the inner-ring raceway and on the outer-ring raceway. The inner ring is preferably manufactured from a steel having a sulfur content of 0.002 to 0.015 mass % and an oxygen content less than 15 ppm and is hardened by a heat treatment. In the region of the inner-ring raceway, the inner ring exhibits compressive residual stresses formed in a surface layer (edge zone) by cold working. The surface of the inner-ring raceway is formed by a blued layer (black oxide layer). The surface layer of the inner ring has a microstructure modified by a thermal post-treatment after formation of the blued layer.

The modified microstructure in the surface layer of the inner ring can exhibit dislocations arranged in an energetically favorable manner by the previous cold working process, on which carbon atoms are segregated as a result of the thermal post-treatment. This modification stabilizes the microstructure and can be detected by a measurement of the decrease of the peak width of the X-ray diffraction line. For example, with a decrease of at least 0.05° of the full width at half maximum of the {211}-ferrite (martensitic/bainitic) X-ray diffraction line, excited by chromium Kα X-ray radiation, at at least one location within the surface layer, a significant modification of the microstructure can be assumed.

The rolling-element bearing can e.g. be a rolling-element bearing of a wind turbine, particularly preferably of a wind turbine gearbox.

The present teachings further relate to a wind turbine having at least one rolling-element bearing manufactured or formed according to the present teachings.

Further objects, embodiments, advantages and designs of the present teachings will be explained in the following, or will become apparent, with the assistance of the exemplary embodiments and the appended Figures.

DETAILED DESCRIPTION OF THE INVENTION

Figure 1:
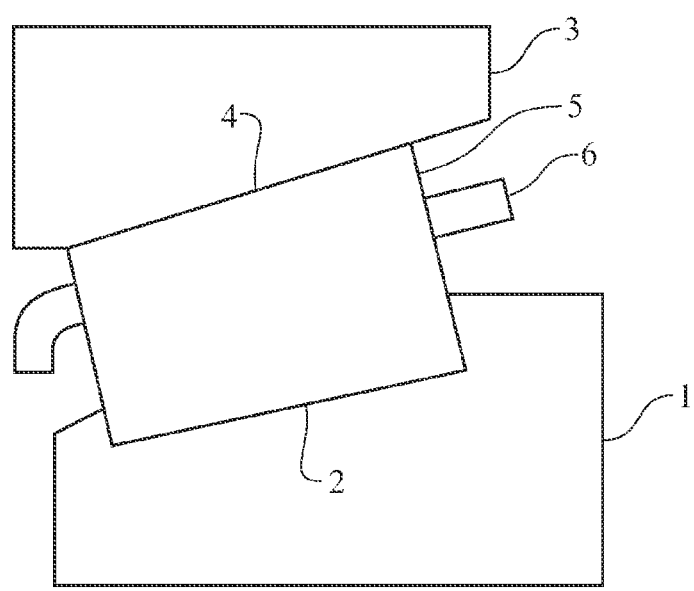
FIG. 1 shows an exemplary embodiment of a rolling-element bearing formed according to the present teachings in a schematic sectional view.

FIG. 1 shows a schematic sectional view of an exemplary embodiment of a rolling-element bearing formed according to the present teachings. The depicted rolling-element bearing is formed as a tapered roller bearing and includes an inner ring 1 having a conical inner-ring raceway 2 and an outer ring 3 having a conical outer-ring raceway 4. Conical rolling elements 5 roll on the inner-ring raceway 2 and the outer-ring raceway 4. The rolling elements 5 are guided in a cage 6. The rolling-element bearing can have very large dimensions. For example the outer diameter of the outer ring 3 can be at least 50 cm, preferably at least 70 cm, more preferably at least 80 cm, or even 1 m or more. The inner diameter of the inner ring 1 can be at least 30 cm, preferably at least 50 cm, or even 70 cm or more. Such rolling-element bearings can for example be formed or used as components of a wind turbine.

As an alternative to the depicted exemplary embodiment, the rolling-element bearing can instead be formed, e.g., as a cylindrical roller bearing with cylinder-shaped rolling elements.

The inner ring 1 of the rolling-element bearing of the present exemplary, non-limiting embodiment is manufactured from a through-hardening steel, for example from the rolling-element bearing steel 100Cr6 (or SAE 52100 steel). Likewise, the inner ring 1 can be manufactured from a case hardening steel, for example from the steel 18NiCrMo14-6. Such steel is manufactured with a very low sulfur content and a very low oxygen content. The sulfur content is preferably between 0.002 and 0.015 mass %, more preferably between 0.006 and 0.015 mass %. The oxygen content is preferably less than 15 ppm, more preferably less than 10 ppm or when possible even less than 5 ppm.

The inner ring 1 is hardened by a heat treatment. For example, martensitic hardening may be performed on the inner ring 1. In this case, the process parameters of the austenitization, quenching and tempering performed during the martensitic hardening are preferably chosen such that a retained austenite content results between 8 and 18 volume %, e.g. between 10 and 16 volume %.

After completion of the heat treatment, the inner ring 1 may optionally be subjected to a mechanical surface processing (treatment), such as grinding. In an exemplary grinding process, the inner-ring raceway 2 may be formed or shaped with a predetermined geometry and a predetermined surface finish. As a result of the grinding, for example, distortions created during hardening can be compensated for. Honing can also follow the grinding, in order to generate an especially smooth surface with low roughness for good tribological properties.

Next, the inner ring 1 is subjected to cold working in the area of the inner-ring raceway 2. The cold working can be achieved for example by shot peening, deep rolling and/or hot oil jets (hot oil peening) on the inner ring raceway 2. To eliminate any surface damage or plastic deformations and/or to optimize the generated compressive residual stress state near the surface in the final condition, the inner ring raceway 2 optionally may again be ground and/or honed following the cold working.

As a result of the cold working, compressive residual stresses are generated in a surface (edge zone) layer in the inner ring 1. The compressive residual stresses influence the lifespan of the rolling-element bearing in a very advantageous manner. The size and depth profile of the residual compressive stresses are explained in more detail in an exemplary, non-limiting embodiment shown in FIG. 2.

Figure 2:
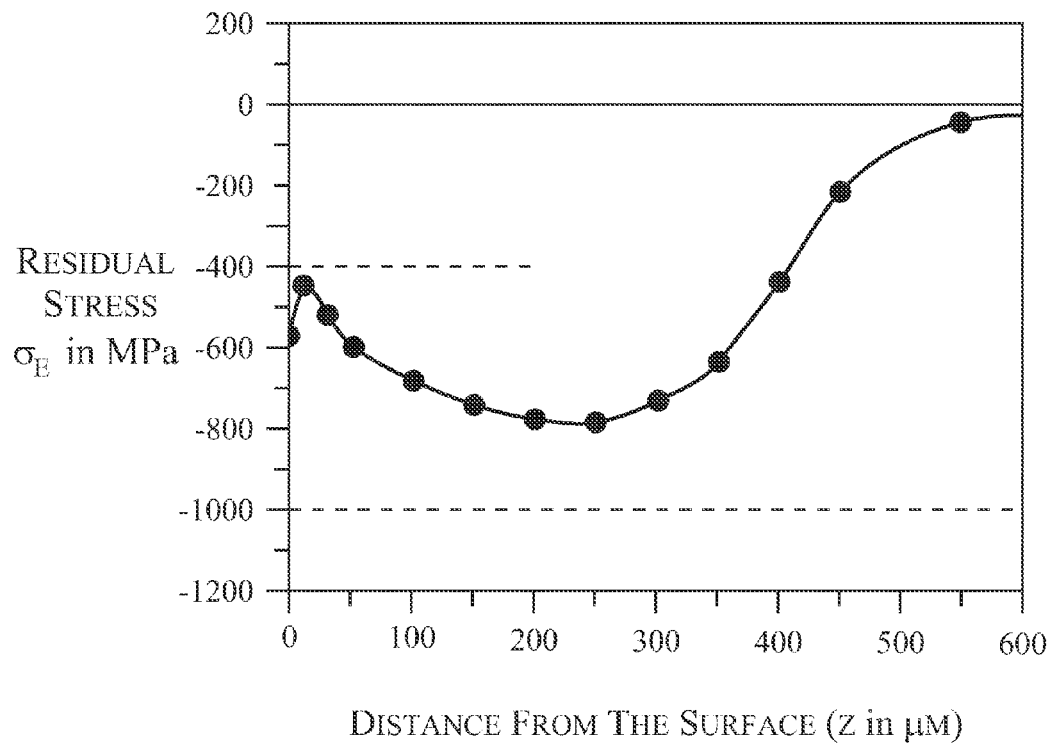
FIG. 2 shows a diagram that illustrates the distribution of the compressive residual stresses in a representative inner ring.

FIG. 2 shows a diagram illustrating the distribution of the residual stresses in a representative inner ring 1. The depth or distance below the (outer) surface of the inner ring raceway 2 is plotted on the abscissa. The value of the residual stress for each depth is plotted on the ordinate. Negative values of the residual stress indicate a compressive residual stress; positive values of the residual stress would indicate a tensile residual stress.

The residual stress has a negative value throughout the entire depicted range, which range can be equated with the aforementioned surface layer, so that there is a compressive residual stress throughout the "surface layer". At the (outer) surface of the inner ring raceway 2, the absolute value of the compressive residual stress is slightly below 600 MPa, which represents a typical value after honing. With (at) increasing depths, the absolute value of the compressive residual stress first decreases to slightly above 400 MPa at a depth of about 0.01 mm. With (at) further increasing depths, the absolute value of the compressive residual stress increases again and at a depth of 0.20 mm to 0.25 mm approaches a value of 800 MPa, however without reaching this value. At even greater depths, the absolute value of the compressive residual stress once again continuously decreases.

It has been established that a long lifespan (service life) of the rolling-element bearing can be achieved if the absolute value of the compressive residual stress at a minimum depth is not below a minimum value. The minimum depth preferably should be 0.1 mm, or e.g. 0.2 mm. The minimum value for the absolute value of the compressive residual stress should be 200 MPa, more preferably, 400 MPa or 500 MPa. At depths greater than the minimum depth, the inner ring 1 can exhibit compressive residual stresses having an absolute value below the minimum value. In particular the absolute value of the compressive residual stress at depths greater than the minimum depth can decrease with (at) increasing depths. Furthermore, the absolute value of the compressive residual stresses over the entire depth range should not exceed a maximum value. The maximum value is preferably 1500 MPa, more preferably 1000 MPa or even only 800 MPa.

After the cold working and any optional mechanical surface finishing that may be necessary to achieve a suitable roughness, the inner ring 1 is subjected to bluing (passivation). The bluing can be performed in the manner described in DE10 2007 061 193 A, which is incorporated herein by reference. The inner ring 1 after bluing is depicted in FIG. 3.

Figure 3:
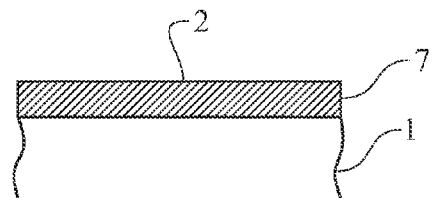
FIG. 3 shows a greatly enlarged schematic sectional view of the inner ring in the region of the inner-ring raceway.

FIG. 3 shows a greatly enlarged schematic sectional view of segment of the inner ring 1 in the area of the inner-ring raceway 2.

The (outer) surface of the inner-ring raceway 2 is formed by a thin blued (black oxide) layer 7. The thickness of the blued layer 7 can be less than 1 μm or up to a few μm, e.g., 3 μm, 4 μm or 5 μm. The blued layer 7 is formed relatively thick and has a deep black color. The blued layer 7 is preferably formed so that it is liquid-impermeable.

After the bluing, the inner ring 1 is subjected to a thermal post-treatment. The thermal post-treatment is performed at a temperature that is at least 10 K below the tempering temperature of the inner ring 1, for example in the range from 190 to 230° C. In any case, a temperature above 100° C. should be utilized. The thermal post-treatment is especially effective if it is performed at a temperature that is at most 100 K, or even better at most 50 K, below the tempering temperature. The temperature of the thermal post-treatment can also be increased to within less than 10 K of the tempering temperature. Then, however, a relatively precise temperature control must be ensured, in order to avoid exceeding the tempering temperature. The microstructure of the inner ring 1 stabilizes as a result of the thermal post-treatment. That is, in a manner similar to Cottrell atmospheres, carbon atoms agglomerate themselves in a segregation process on dislocation cores, which form energetically favorable configurations (e.g. dipole, multi-pole) during the plastic deforming in the cold working and surface machining as a result of the induced sliding processes, and thus stabilize these favorable dislocation arrangements. The processes occurring under rolling contact loading (e.g. rolling contact fatigue) are thus favorably influenced, i.e. in particular the material-damaging effects of these processes are slowed.

After the performance of the thermal post-treatment, the inner ring 1 is completed and can be used in an assembly containing the rolling-element bearing, such as a wind turbine gearbox.

Bainitic hardening can be performed as the hardening heat treatment instead of martensitic hardening. In this case the thermal post-treatment is carried out at a temperature that is at least 10 K below the bainitic transformation temperature, which is e.g., between 200-250° C., more preferably between 210-240° C. The above statements concerning the temperature limits of martensitic hardening apply here in an analogous manner.

In general, the thermal post-treatment is carried out at a temperature that is below, preferably at least 10 K below, the temperature of a final heat treatment step. If martensitic hardening is performed, the final hardening heat treatment step is the tempering. Accordingly the temperature of the final hardening heat treatment step is the tempering temperature. If bainitic hardening is performed, the final hardening heat treatment step is the bainitic transformation. Accordingly the temperature of the final hardening heat treatment step is the bainitic transformation temperature, as was noted above.

The outer ring 3 and/or the rolling elements 5 can be manufactured from the same material as the inner ring 1. The process steps described for the inner ring 1 can be used, individually or in combination, for the processing of the outer ring 3 and/or the rolling elements 5. However modified process steps can also be used.

Additional embodiments disclosed herein include, but are not limited to:

1. A method for manufacturing a rolling-element bearing, which includes an inner ring (1) having an inner-ring raceway (2), an outer ring (3) having an outer-ring raceway (4) and rolling elements (5), which roll on the inner-ring raceway (2) and on the outer-ring raceway (4), wherein
    the inner ring (1) is manufactured from a steel having a sulfur content of 0.002 to 0.015 mass % and an oxygen content of less than 15 ppm,
    the inner ring (1) is subjected to a heat treatment to harden it, which heat treatment is concluded with the performance of a final heat treatment step at a predetermined temperature,
    in the inner ring (1), compressive residual stresses are formed in a surface layer by cold working in the area of the inner-ring raceway (2),
    the inner ring (1) is subjected to bluing after the cold working and
    the blued inner ring (1) is subjected to a thermal post-treatment at a temperature below the temperature of the final hardening heat treatment step.

2. A method according to embodiment 1, wherein prior to the cold working (e.g., in the hardening heat treatment step), the inner ring (1) is subjected to martensitic, case, and/or induction hardening and the temperature of the final hardening heat treatment step is the tempering temperature of the inner ring (1).

3. A method according to embodiment 1, wherein prior to the cold working (e.g., in the hardening heat treatment step), the inner ring (1) is subjected to bainitic hardening, and the temperature of the final hardening heat treatment step is the bainitic transformation temperature of the inner ring (1).

4. A method according to any one of embodiments 1-3, wherein a retained austenite content of 8 to 18 volume % is formed in the inner ring (1).

5. A method according to any one of the preceding embodiments, wherein compressive residual stresses are formed in the inner ring (1) up to a minimum depth beneath the surface of the inner-ring raceway (2) with an absolute value of a minimum value or greater, and
    the minimum depth is 0.1 mm, and
    the minimum value of the absolute value of the residual compressive stresses is 200 MPa, more preferably 400 MPa, more preferably 500 MPa, even more preferably 600 MPa, or even 700 MPa.

6. A method according to any one of the preceding embodiments, wherein compressive residual stresses are formed in the inner ring (1) beneath the surface of the inner ring raceway (2) with an absolute value of a maximum value or less, and
    the maximum value of the absolute value of the compressive residual stresses is 1500 MPa, more preferably 1000 MPa, even more preferably 900 MPa, or even 800 MPa.

7. A method according to any one of the preceding embodiments, wherein the inner ring (1) is subjected to the thermal post-treatment at a temperature which is at least 10 K below the temperature of the final hardening heat treatment step, but preferably no more than 100 K below, even more preferably no more than 50 K below.

8. A method according to any one of the preceding embodiments, wherein the outer ring (3) and/or the rolling elements (5) are subjected to a hardening heat treatment with a final heat treatment step, a cold working, a bluing treatment and/or a thermal post-treatment at a temperature below the temperature of the final heat treatment step in accordance with any of the preceding embodiments.

9. A rolling-element bearing produced by the method of any preceding embodiment.

10. A rolling-element bearing, which includes an inner ring (1) having an inner-ring raceway (2), an outer ring (3) having an outer-ring raceway (4) and rolling elements (5), which roll on the inner-ring raceway (2) and on the outer-ring raceway (4), wherein
    the inner ring (1) is manufactured from a steel having a sulfur content of 0.002 to 0.015 mass % and an oxygen content of less than 15 ppm,
    the inner ring (1) is hardened by a heat treatment,
    the inner ring (1) exhibits compressive residual stresses formed by cold working, which compressive residual stresses are present in a surface layer (edge zone) in the area of the inner-ring raceway (2),
    the (outer) surface of the inner-ring raceway (2) is a blued layer (7) and
    the inner ring (1) has a microstructure in the surface layer that is modified by thermal post-treatment after formation of the blued layer (7).

11. A wind turbine comprising a rolling-element bearing according to embodiment 9 or 10.

12. A method, rolling element bearing and/or wind turbine according to any preceding embodiment, wherein the inner ring is formed from a steel that comprises 0.65-1.20 wt % C (more preferably 0.8-1.20 wt % C), 0.05-1.70 wt % Si, 1.1-2.2 wt % Cr, 0.10-1.0 wt % Mn, 0.02-1.0 wt % Ni, 0.02-0.70 wt % Mo, the balance being Fe and unavoidable impurities.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling-element bearings and wind turbines, e.g., wind turbine gearboxes, as well as methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Inner ring
2 Inner-ring raceway
3 Outer ring
4 Outer-ring raceway
5 Rolling element
6 Cage
7 Blued layer

The invention claimed is:

1. A method for manufacturing a rolling-element bearing, which includes an inner ring having an inner-ring raceway, an outer ring having an outer-ring raceway and a plurality of rolling elements that are rollable on the inner-ring raceway and on the outer-ring raceway, the method comprising:
forming the inner ring from a steel having a sulfur content of 0.002 to 0.015 mass % and an oxygen content of less than 15 ppm,
subjecting the inner ring to a heat treatment to harden it, which heat treatment ends by performing a final hardening heat treatment step at a predetermined temperature,
cold working the inner-ring raceway to generate compressive residual stresses at least in a surface layer of the inner-ring raceway,
subjecting the cold-worked inner ring to a bluing treatment to form a blued layer on an outer surface of the inner ring, and
subjecting the blued inner ring to a thermal post-treatment process at a temperature below the predetermined temperature of the final hardening heat treatment step.

2. The method according to claim 1, wherein the temperature of the thermal post-treatment process is at least 10 K below the predetermined temperature of the final hardening heat treatment step.

3. The method according to claim 2, wherein the temperature of the thermal post-treatment process is at least 100° C.

4. The method according to claim 3, wherein the temperature of the thermal post-treatment process is no more than 100 K below the predetermined temperature of the final hardening heat treatment step.

5. The method according to claim 1, wherein the hardening heat treatment step comprises subjecting the inner ring to martensitic, case and/or induction hardening and
wherein the predetermined temperature of the final hardening heat treatment step is a tempering temperature of the inner ring.

6. The method according to claim 5, wherein a retained austenite content of 8 to 18 volume % is formed in the inner ring by the martensitic, case, and/or induction hardening.

7. The method according to claim 1, wherein the cold working step is performed such that compressive residual stresses are formed in the inner ring up to a minimum depth beneath the outer surface of the inner-ring raceway with an absolute value of a minimum value or greater, the minimum depth being 0.1 mm and the minimum value being at least 200 MPa.

8. The method according to claim 7, wherein the minimum depth is 0.2 mm and the minimum value is 400 MPa or more.

9. The method according to claim 1, wherein the cold working step is performed such that compressive residual stresses formed in the inner ring have a maximum absolute value of 1500 MPa or less.

10. The method according to claim 9, wherein the maximum absolute value is 800 MPa or less.

11. The method according to claim 1, wherein the hardening heat treatment step comprises subjecting the inner ring to bainitic hardening, and
wherein the predetermined temperature of the final heat treatment step is a bainitic transformation temperature of the inner ring.

12. The method according to claim 1, wherein the temperature of the final hardening heat treatment step is higher than temperatures of the cold working, the bluing treatment and the thermal post-treatment process.

13. The method according to claim 1, wherein the inner ring is formed from a steel having a sulfur content of 0.006 to 0.015 mass % and an oxygen content of less than 10 ppm.

14. The method according to claim 1, wherein the inner ring is formed from a steel that comprises 0.65-1.20 wt % C, 0.05-1.70 wt % Si, 1.1-2.2 wt % Cr, 0.10-1.0 wt % Mn, 0.02-1.0 wt % Ni, 0.02-0.70 wt % Mo.

15. A method for manufacturing a rolling-element bearing, which includes an inner ring having an inner-ring raceway, an outer ring having an outer-ring raceway and a plurality of rolling elements that are rollable on the inner-ring raceway and on the outer-ring raceway, the method comprising:
forming the inner ring from a steel having a sulfur content of 0.006 to 0.015 mass % and an oxygen content of less than 10 ppm, the inner ring having an inner diameter of at least 50 centimeters,
subjecting the inner ring to a hardening heat treatment that ends by performing a final hardening heat treatment step at a predetermined temperature,
cold working the inner-ring raceway to generate compressive residual stresses at least in a surface layer of the inner-ring raceway, the compressive residual stresses having an absolute value of at least 500 MPa at 0.2 mm beneath an outer surface of the inner-ring raceway and a maximum value of 800 MPa or less throughout the inner ring,
subjecting the cold-worked inner ring to a bluing treatment to form a blued layer on an outer surface of the inner-ring raceway, and
subjecting the blued inner ring to a thermal post-treatment process at a temperature of at least 100° C. and between 10-100° C. below the predetermined temperature of the final hardening heat treatment step.

16. The method according to claim 15, wherein:
the inner ring is formed from a steel that comprises 0.8-1.20 wt % C, 0.05-1.70 wt % Si, 1.1-2.2 wt % Cr, 0.10-1.0 wt % Mn, 0.02-1.0 wt % Ni, 0.02-0.70 wt % Mo;
the hardening heat treatment is a bainite transformation performed at a temperature between 210-240° C.; and
the thermal post-treatment process is performed at a temperature between 190-230° C.

* * * * *